United States Patent Office 2,830,040
Patented Apr. 8, 1958

2,830,040

SEPARATION OF OPTICAL ANTIPODES

Wilhelm Schlenk, Mannheim-Feudenheim, Germany, assignor to Badische Anilin- & Soda-Fabrik Aktiengesellschaft, Ludwigshafen (Rhine), Germany No Drawing. Application March 20, 1956
Serial No. 572,631

Claims priority, application Germany March 24, 1955

8 Claims. (Cl. 260—96.5)

This invention relates to a new and improved method of separating optical antipodes.

In my copending appplication Serial No. 449,255, filed August 8, 1954, I have described a process for the separation of optical antipodes from a racemic mixture which comprises adding urea to a racemic mixture of substances capable of forming inclusion compounds with urea, separating the inclusion compounds thus formed and splitting them up into their components. In these inclusion compounds the molecules forming inclusion lattices are arranged along spiral lines. As a result the lattices occur in two anantiomorphic forms one of which corresponds to a left-hand spiral and the other to a right-hand spiral. The success of the process depends on that either the left-hand spiral or the right-hand spiral-type of the lattice is predominantly formed in the crystallizate. The formation of either spiral-type lattice may be left to the chance of a first formation of a crystal nucleus or can be directed at will by inoculation with adduct crystals of the right-hand or left-hand structure.

I have now found that the formation of one or the other spiral lattice and consequently the preferential crystallization of one or other of the antipodes can be directed at will by adding to the mixture to be separated optically-active substances miscible therewith. As active substances of the type dissolving the mixture or being dissolved by it there may be used as well those which themselves, either alone or in the presence of the molecule of the racemate to be bound, form inclusion compounds, as those which do not form adducts. In both cases the added optically-active substance induces the preferential formation of one definite form of the two mirror-image forms of the inclusion lattice.

As an active addition of the first-mentioned kind there may serve one of the two antipodes of which the racemate to be separated consists; any other optically-active substance capable of being added on by the substance forming the lattice may, however, also be used.

As additional substances which are not themselves included in the lattice there may serve optically-active substances of a great variety of classes of compounds. Since the molecules of these substances do not need to find a place in the inclusion lattice, there is no limitation as regards their shape. The following substances, for example, have been found to be active: (—)-2-methylbutanol-1 (amyl alcohol of fermentation), d-sorbitol, d-fructose, 1-sorbose, d-xylose, cane sugar, (+)-cholic acid, (+)-deoxycholic acid, d-tartaric acid, d-diethyl-tartrate, Seignette salt, (—)-tall oil resin acids, (—)-colophony, (—)-leucine and (+)-alanine.

For each of the said substances it is characteristic that without exception it always induces the formation of one and the same form of the inclusion lattice. If, instead of the substance in question, the mirror-image form is used, for example (+)-2-methylbutanol-1 instead of (—)-2-methylbutanol-1 or (+)-leucine instead of (—)-leucine, the opposite form of the inclusion lattice is induced.

The production of the adducts and their separation takes place for the rest in the same way as in the process described in the said application Ser. No. 449,255. The substances to be added are used in amounts of 0.1 to 20% with reference to the mixture to be separated. Substances which do not form adducts may also be used in larger amounts, as for example 20 to 300%. The added optically-active substances remain wholly or for the most part in the mother liquor and are used again therewith for the separation of racemic mixtures.

The advantage of the process according to the present invention lies in the fact that the process makes it independent of the accident of the first nucleus formed in the crystallization of the adduct and increases the sharpness of the separation.

Just as described in my copending application Ser. No. 449,255 the process is not restricted to organic compounds bearing any special functional groups. Nevertheless it can be said that the most important class of compounds to be treated according to my invention is that of asymmetrical esters, wherein the alcohol component as well as the acid component or both of them may be asymmetric. Examples for such esters are:

The octyl ester of α-chloropropionic acid, the octyl ester of α-bromopropionic acid, The hexyl ester of lactic acid, the heptyl ester of lactic acid, the decyl ester of lactic acid, The heptyl ester of α-chlorobutyric acid, the decyl ester of α-bromobutyric acid, the heptyl ester of β-chlorobutyric acid, the octyl ester of α-methylbutyric acid, the octyl ester of α-hydroxy butyric acid, the heptyl ester of β-hydroxy butyric acid, the octyl ester of β-aminobutyric acid, The heptyl ester of α-chlorovaleric acid, the heptyl ester of γ-chlorovaleric acid, the octyl ester of β-methyl valeric acid, the heptyl ester of γ-hydroxy valeric acid, The decyl ester of α-bromocaproic acid, the heptyl ester of γ-chlorocaproic acid, the octyl ester of δ-chlorocaproic acid, the decyl ester of α,γ-dimethyl valeric acid, the octyl ester of leucine, the decyl ester of leucine, the decyl ester of α-chloroisocaproic acid, the decyl ester of α-methyl caproic acid, The butanol-2-ester of caprylic acid, the butanol-2-ester of caprinic acid, the octanol-2-ester of caprylic acid, the octanol-2-ester of caprinic acid, The diamyl ester of α-chlorosuccinic acid, the diamyl ester of malic acid, the diheptyl ester of α-methyl-succinic acid, the diheptyl ester of dichlorosuccinic acid, The diamyl ester of α-chloroglutaric acid, the diheptyl ester of α-methylglutaric acid, the dibutyl ester of α-chloro-adipic acid.

The following examples will further illustrate this invention but the invention is not restricted to these examples. The parts are by weight.

*Example 1*

2 parts of (—)-diamyl-malate are introduced into 18 parts of d,l-diamyl-malate, after which the mixture shows the rotation $\alpha_D = -1.04°$. 100 parts of a methanol solution of urea, saturated at room temperature, are then added to the mixture. After separating the precipitate thus formed, the filtrate is cooled from 25.6° C. to 7.5° C. during the course of 20 hours while stirring slowly. The crystalline precipitate (6 parts) yields, upon decomposition with water, 1.5 parts of diamyl malate having the rotation value $\alpha_D = -2.75°$.

A further 6 parts of urea are added at 23° C. and the small amount of immediate precipitate removed. Upon repeating the cooling, the filtrate again yields 6 parts of urea adduct from which by decomposition with water 1.5 parts of diamyl malate are obtained with the rotation value $\alpha_D = -2.37°$.

Example 2

0.6 part of (—)-diamyl-malate is added to 20 parts of racemic diheptyl dichlorsuccinate. To the mixture, which exhibits a rotation $\alpha_D = -0.23°$, there are added 100 parts of methanol solution of urea which is saturated at room temperature. After removing the slight immediate precipitate thereby formed, the filtrate is cooled during the course of 22 hours while stirring slowly from 25.2° C. to 6.5° C. and 3 parts of urea adduct are obtained which upon decomposition with water yield 1 part of ester. The product has a rotation $\alpha_D = +2.55°$. It consists to the extent of 90% of diheptyl dichlorsuccinate and to the extent of 10% of diamyl malate and is separated by vacuum distillation.

Example 3

0.5 part of l-leucine is dissolved as an inductor in 100 parts of methanol solution of urea saturated to room temperature. 8 parts of d,l-methylethylacetic acid decyl ester are added, the precipitate immediately formed is removed by filtration and the filtrate is cooled in the course of 20 hours from 24.7° C. to 6° C. while stirring slowly. 2.3 parts of crystalline urea adduct are obtained which is free from leucine and which upon decomposition with water yields 0.6 part of dextro-rotatory methylethylacetic acid decyl ester ($\alpha_D = +0.50°$).

Example 4

10 parts of (+)-tartaric acid are added to 100 parts of methanol solution of urea saturated at room temperature, as an inductor. Into the resultant solution there are introduced a further 6 parts of urea and then 20 parts of d,l-beta-heptyl-chlorbutyrate. After separating the slight immediate precipitate, the filtrate is cooled from 26° C. to 7° C. during the course of 22 hours and 5.1 parts of a urea adduct free from tartaric acid is obtained which yields upon decomposition with water 1.3 parts of laevorotatory beta-heptyl-chlorobutyrate ($\alpha_D = -1.00°$).

What I claim is:

1. A process for the separation of the optical antipodes of a racemic mixture which comprises adding urea to a racemic mixture whereof the optical antipodes are capable of forming inclusion compounds with urea in the presence of an added optically active substance miscible with said racemic mixture, separating from each other the inclusion compounds of the optical antipodes, thus formed, and decomposing each of said inclusion compounds into the components thereof.

2. The process of claim 1 wherein the added optically active substance forms an inclusion compound with urea.

3. The process in accordance with claim 2 wherein the added optically active substance is one of the antipodes of the racemic mixture.

4. The process in accordance with claim 1 wherein the added optically active substance is one which does not form an inclusion compound with urea.

5. The process in accordance with claim 1 wherein the added optically active substance is one of the two antipodes of the racemic mixture.

6. The process in accordance with claim 1 wherein the added optically active substance is added in an amount of 0.1% to 20% with reference to the racemic mixture.

7. The process in accordance with claim 1 wherein the added optically active substance does not form an inclusion compound with urea and is added in an amount of 0.1% to 300% with reference to the racemic mixture.

8. The process in accordance with claim 1 wherein the added optically active substance does not form an inclusion compound with urea and is added in an amount of 20% to 300% with reference to the racemic mixture.

References Cited in the file of this patent

Swern: Ind. & Chem., vol. 47, pages 220–221, February 1955.